Oct. 9, 1951     A. L. BUSSON     2,570,317
FLOW REGULATING VALVE
Filed June 18, 1945
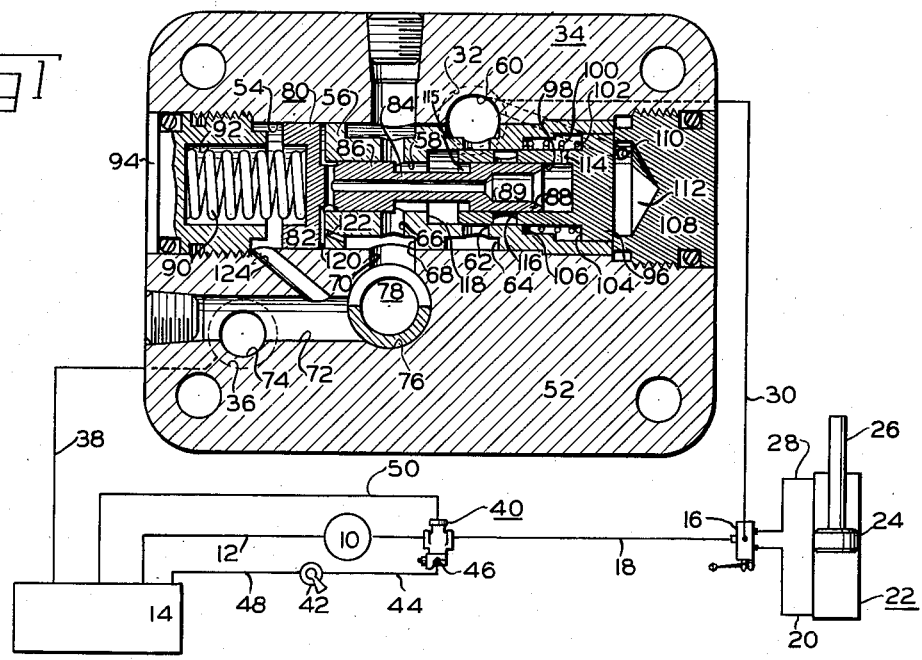
INVENTOR.
AMBROSE L. BUSSON
BY
ATTORNEY Patented Oct. 9, 1951

2,570,317

UNITED STATES PATENT OFFICE 2,570,317

FLOW-REGULATING VALVE

Ambrose L. Busson, Detroit, Mich., assignor to Vickers Incorporated, Detroit, Mich., a corporation of Michigan Application June 18, 1945, Serial No. 600,005

7 Claims. (Cl. 60—52)

This invention relates to power transmissions, particularly to those of the type comprising two or more fluid pressure energy translating devices, one of which may function as a pump and another as a fluid motor.

In particular, the invention relates to an improvement in a flow-regulating valve comprising an adjustable throttle and a compensating valve for maintaining a constant flow across the throttle through which fluid is adapted to flow at a regulated rate regardless of load resistance.

Flow-regulating valves have an important use in hydraulic power transmissions for driving machine tools. They serve the purpose of producing a reduced speed rate of the machine tool, and the machine tool may be driven at a constant regulated rate of speed regardless of load resistance.

In the past some difficulty was presented in preventing motor jump when the motor was started after interruption and in particular when a machine tool slide was moved into a feed position from rest or where there was a resumption of a feed movement after interruption during a slide movement. In many cases, if a feed movement was interrupted and the operator of the slide machine tool did not back the tool away from the work before resuming a cut, the tool was ruined. This is due to the fact that, when flow through the flow-regulating valve is interrupted, the compensating valve is held to the fully open position by a compensating valve spring. When flow is resumed after interruption, a temporary flow of fluid above the normal regulated rate passes through the open compensating valve before it is able to assume normal regulating position. Although this is only a momentary lapse and the compensating valve almost immediately assumes normal regulating position, this temporary flow of fluid above the normal regulated rate causes the motor to jump slightly before a constant regulated movement begins and ruins a cutting tool.

In the past this difficulty has been avoided by the addition of valves incorporated in the transmission to induce a flow through the flow-regulating valve when flow to the motor was interrupted, thereby placing the compensating valve already in a position to regulate normally when flow to the motor was resumed. This necessitated additional valves, lines and fittings in the hydraulic transmission.

It is an object of this invention to provide an improved flow-regulating valve for use in a hydraulic transmission containing a fluid pump and motor which will prevent motor jump when flow is resumed through the flow-regulating valve after interruption.

It is also an object of this invention to provide a flow-regulating valve which will prevent motor jump when flow is resumed through the flow-regulating valve after interruption by preventing a flow above the normal regulated rate before the compensating valve assumes regulating position.

It is also an object of this invention to incorporate in combination with an adjustable throttle and compensating valve, comprising a flow-regulating valve, a pressure responsive sleeve to prevent a flow of fluid above the normal regulated rate when the motor is started after interruption.

It is a further object of this invention to provide an improved flow-regulating valve which will prevent motor jump when flow is resumed through the flow-regulating valve after interruption which may be economically manufactured, simple in operation, and which avoids the addition to the hydraulic transmission of extra valves, lines or fittings.

Further objects and advantages of the present invention will be apparent from the following description, reference being had to the accompanying drawing wherein a preferred form of the present invention is clearly shown.

In the drawing:

Figure 1 is a diagrammatic view of a hydraulic power transmission system incorporating a preferred form of the present invention in the closed position.

Figure 2 is a diagrammatic view of the same hydraulic power transmission system shown in Figure 1 showing the parts in a different position.

Referring now to Figure 1, there is shown a pump 10 which may be driven by an electric motor, not shown, which has a supply conduit 12 connected to a tank 14 and which is connected to a suitable four-way directional valve 16 by means of a pump delivery conduit 18. A conduit 20 connects valve 16 to the head end of a motor 22 having a piston 24 to which is connected a piston rod 26, and a conduit 28 connects valve 16 to the rod end of motor 22. A return conduit 30 connects valve 16 to the inlet port 32 of a flow-regulating valve 34. An outlet port 36 of valve 34 is connected to tank 14 by means of a conduit 38.

Incorporated in the pump delivery conduit 18 is a suitable relief valve 40 which is preferably constructed in accordance with the disclosure of the patent to Harry F. Vickers, No. 2,043,453. Valves of this character may be provided with a venting port for venting the control chamber in order to permit the main valve to act as an unloading valve and bypass the pump delivery at negligible pressure.

A suitable manually-controlled, two-way control valve 42 is connected by means of a conduit 44 to a venting port 46 of valve 40, and a conduit 48 connects valve 42 with tank 14. An exhaust conduit 50 connects valve 40 to tank 14. In one position, valve 42 will close venting port 46 and direct fluid from pump 10 to valve 16 which will direct it to motor 22 to start said motor; while, in another position, valve 42 will open venting port 46 to tank 14 by means of conduits 44 and 48, permitting valve 40 to open completely and unload pump 10 to tank 14 by means of the exhaust conduit 50, thus stopping motor 22. Relief valve 40 serves as a safety factor in limiting the maximum pressure attainable in the system and will relieve to tank 14 any amount of fluid from pump 10 in excess of which valve 34 is originally adjusted to pass.

Valve 34 is comprised of a body 52 having a main longitudinal stepped bore 54 in which is tightly inserted a sleeve 56. Sleeve 56 has a longitudinal stepped bore 58 which is in communication with an inlet passage 60 by means of a passage 62 and a groove 64. Another passage 66 and a groove 68 of sleeve 56 form a means of communication between bore 58 and a passage 70 in body 52. A passage 72 forms a means of communication between passage 70 and an outlet passage 74 which is in communication with outlet port 36.

Rotatably mounted in a bore 76, which intersects passages 70 and 72, is an adjustable throttle valve 78 which serves as an adjustable restriction to flow from passage 70 to passage 72.

Shiftable within bore 58 of sleeve 56 and bore 54 of body 52 is a compensating valve 80 comprised of a hollow piston 82 to which is connected a stem 84 having a land 86 immediately to the right of piston 82 and a land 88 spaced apart from land 86 at the extreme right end of stem 84. Stem 84 is provided with a stepped bore forming a passage 89 extending the complete length of the stem to the base of piston 82. A spring 90 located in a chamber 92 in bore 54, between piston 82 and an end cap 94 threaded into the left end of bore 54, abuts piston 82 and normally positions valve 80 to the position shown. A sleeve 96 having a hollow portion forming a chamber 98 is inserted in the right end of bore 58 of sleeve 56. A spring 100 of predetermined tension is located in a chamber 102 formed in bore 58 between a flange 104 of sleeve 96 and a shoulder 106 of sleeve 56. A plug 108, threaded into the right end of bore 54, originally positions sleeve 96 to the position shown.

A passage 110 connects inlet passage 60 with a chamber 112 formed in bore 54 between plug 108 and the left end of sleeve 96. A restricted passage 114 in sleeve 96 forms a means of communication between chamber 102 and chamber 98. Land 88 of valve 80 is shiftable within chamber 98 of sleeve 96. Sleeve 96 blocks communication between inlet passage 60 and an inlet chamber 115 formed in bore 58 of sleeve 56 between lands 86 and 88 of valve 80. Ports 116 in sleeve 96 form a means of communication between inlet passage 60 and inlet chamber 115 when sleeve 96 has shifted sufficiently to the left, with leftward movement of sleeve 96 being limited by a shoulder 118 of sleeve 56. A chamber 120 formed in bore 54 between piston 82 of valve 80 and sleeve 56 is in communication with groove 68 by means of a drilled passage 122. Passage 72 is in communication with chamber 92 by means of a branch passage 124.

The inlet and outlet ports 32 and 36 are preferably located at the back of the body 52 and arranged for connection to the circuit lines by suitable "panel mounting" connections such, for example, as are described in the Martin Patent No. 2,204,507.

In operation, with the electric motor running and operating pump 10 and with motor 22 stopped by reason of valve 40 being vented to tank 14, if valve 42 is shifted to close venting port 46 of valve 40 and if valve 16 is shifted to connect conduit 18 to conduit 20 and conduit 28 to conduit 30, fluid under pressure from pump 10 will be delivered to the head end of motor 22. Discharging fluid from the rod end of motor 22 enters conduit 28, valve 16 and conduit 30 to the inlet port 32 of valve 34. Fluid entering inlet port 32 enters inlet passage 60 and is prevented from entering inlet chamber 115 by sleeve 96 and flows by means of passage 110 to chamber 112 where it reacts against the right end of sleeve 96.

Although fluid in the hollow portion 98 of sleeve 96 has a free outlet to tank 14 by means of the stepped bore 89 in the compensating valve 80, chamber 120, passage 122, passage 66, groove 68, passage 70, throttle 78, passage 72, outlet passage 74, outlet port 36 and conduit 38, fluid in chamber 102 is restricted by means of passage 114. Passage 114, because of its size, forms a restriction which provides a dashpot reaction for the movement of sleeve 96 to the left.

When sleeve 96 has shifted sufficiently to cause passage 116 of sleeve 96 to break over passage 62 of sleeve 56, fluid from inlet passage 60 is still blocked from communication with inlet chamber 115 by reason of land 88. The continual but gradual shifting of sleeve 96 finally causes passage 116 of sleeve 96 to break over land 88, thus permitting fluid from inlet passage 60 to flow into inlet chamber 115 from whence it flows to tank 14 by means of passage 66, groove 68, passage 70, throttle 78, passage 72, outlet passage 74, outlet port 36 and conduit 38.

The purpose and function of compensating valve 80, which is well known in the prior art, is to maintain a constant pressure drop across throttle 78. If the discharge of fluid from motor 22 is kept at a constant regulated rate, the speed of piston 24 of motor 22 consequently will be constant. Compensating valve 80, by maintaining constant the pressure difference between the pressure in inlet chamber 115 and the pressure in outlet passage 72, will maintain the flow across throttle 78 at a constant regulated rate according to the original adjustment of throttle 78.

When passage 116 of sleeve 96 has shifted sufficiently so as to not only pass over passage 62 of sleeve 56, but also has broken over land 88 of valve 80, the first amount of flow from inlet passage 60 will be small. Fluid entering inlet chamber 115 and flowing to tank 14 also enters chamber 120 by means of passage 66, groove 68 and passage 122 so that the total pressure present in inlet chamber 115 is also present in chamber 120. Excess of fluid over the amount which is flowing to motor 22 is exhausted to tank 14 by means of relief valve 40. Whatever pressure is existent in passage 72 is also existent in chamber 92 by means of passage 124 where it may act against the left side of piston 82 and cause the compensating valve to be truly responsive to the pressure drop across the throttle 78.

As sleeve 96 continues to shift to the left so as to permit a gradually increasing flow of fluid from inlet passage 60 to flow into inlet chamber 115 and across throttle 78, a point will be reached where the pressure will increase in inlet chamber 115 and consequently chamber 120 because of the restriction offered by throttle 78. When the pressure drop is equal to or slightly exceeds the setting of spring 90, this pressure increase which is present in chamber 120 causes piston 82 to shift to the left and partially close passage 116 in sleeve 96, which is now in continual communication with passage 62 because of the presence of fluid pressure in chamber 112 from the discharging end of motor 22. Land 88 closes passage 116 to a degree permitting just enough fluid to enter inlet chamber 115 to maintain constant the pressure drop across throttle 78.

If a sufficient amount of fluid does not enter inlet chamber 115 to maintain a pressure drop equal to the resistance of spring 90, spring 90 will shift compensating valve 80 to the right, causing land 88 to open passage 116 more fully to allow more fluid to enter inlet chamber 115 to maintain constant the flow across throttle 78.

Upon completion of the movement of piston 24 of motor 22, if it is desired to shift piston 24 in the opposite direction, valve 16 is shifted to connect conduit 18 to conduit 28 and conduit 20 to conduit 30 which permits fluid under pressure from pump 10 to enter the rod end of motor 22, and, as in the previous operation, discharging fluid now making an exit from the head end of motor 22 will be controlled by flow-regulating valve 34 in the same manner.

Upon completion of the movement of piston 24 in any direction, if pump 10 is unloaded or if motor 22 is stopped during a movement of piston 24 by venting valve 40 to tank 14 so as to interrupt the flow of fluid through flow-regulating valve 34, spring 100 will shift sleeve 96 to the right. Consequently, when motor 22 is restarted and the flow to flow-regulating valve 34 is resumed, the same operational process is repeated. If it were not for sleeve 96, when motor 22 is stopped and flow through flow-regulating valve 34 is interrupted, compensating valve 80 would move to the fully open position by reason of spring 90.

When motor 22 is restarted so as to resume the flow of fluid from the discharging end of motor 22 through flow-regulating valve 34, due to the fact that compensating valve 80 would be in the fully open position, a temporary flow of fluid more than the amount of fluid which flow-regulating valve 34 is originally adjusted to pass would flow to tank 14, and piston 24 of motor 22 would move faster for a short distance than should be permitted. This is so because, in normal regulating position, compensating valve 80 is never wholly open or wholly closed but always in a partially open or closed position so as to permit just enough fluid to flow across throttle 78 to maintain constant the pressure in inlet chamber 115. Sleeve 96, by temporarily preventing a flow of fluid through a compensating valve that would ordinarily be in the fully open position and then gradually permitting an increasing amount of fluid from the discharging end of motor 22 to flow to tank 14, but always in an amount less than the amount that flow-regulating valve 34 would permit to pass if compensating valve 80 was in a regulating position when motor 22 was started, thus prevents motor jump.

It should be noted that, if at any time an amount of fluid being discharged from motor 22 is in excess of that which flow-regulating valve 34 is originally adjusted to pass, the movement of piston 24 will be faster than the permissible speed. Pressure responsive sleeve 96 makes it impossible for an amount of fluid in excess of the amount which flow-regulating valve 34 is originally adjusted to pass to be discharged from the motor 22 through the fully open compensating valve when a controlled speed movement of the motor is resumed after interruption.

It should also be noted that, once flow to the flow-regulating valve 34 has been resumed and sleeve 96 has shifted completely, it will be held in this position by fluid from the discharging end of motor 22 and will not in any way interfere with the normal operation of compensating valve 80.

While the form of embodiment of the invention as herein disclosed constitutes a preferred form, it is to be understood that other forms might be adopted, all coming within the scope of the claims which follow.

What is claimed is as follows:

1. A flow regulating valve for controlling flow in hydraulic power transmission systems comprising in combination means forming a flow passage having an inlet and an outlet, an adjustable throttle in the passage, a pressure compensating valve biased to a position fully opening the passage when flow to the inlet of the passage is interrupted and including operating means responsive to the pressures ahead of and beyond the throttle for causing the compensating valve to maintain a constant pressure drop across the throttle, resiliently loaded means in the passage ahead of the compensating valve and biased to a position for temporarily closing the passage when fluid flow is resumed to the inlet after interruption, and operating means for the resiliently loaded means responsive to predetermined pressure increases at the inlet of the passage when fluid flow to the inlet of the passage is resumed after interruption for causing the resiliently loaded means to gradually open the passage ahead of the compensating valve.

2. A flow regulating valve for controlling flow in hydraulic power transmission systems comprising in combination means forming a flow passage having an inlet and an outlet, an adjustable throttle in the passage, a pressure compensating valve biased to a position fully opening the passage when flow to the inlet of the passage is interrupted and including operating means responsive to the pressures ahead of and beyond the throttle for causing the compensating valve to maintain a constant pressure drop across the throttle, a resiliently loaded sleeve surrounding the compensating valve and including means for opening and closing the passage, said sleeve being biased to a position for closing the passage when fluid flow to the inlet of the passage is interrupted, and operating means for the sleeve responsive to predetermined increases of pressure at the inlet of the passage when fluid flow is resumed to the passage after interruption for causing the sleeve to gradually open the passage.

3. A flow regulating valve for controlling flow in hydraulic power transmission systems comprising in combination means forming a flow passage, in series in said passage an adjustable throttle through which fluid is adapted to flow at a regulated rate and a pressure compensating valve, operating means for the compensating valve responsive to the pressure drop across the throttle and causing the compensating valve to assume various regulating positions to maintain the pressure drop across the throttle constant and including biasing means which normally tend to move the compensating valve to the fully open position when flow to the passage is interrupted, resiliently loaded means biased to a position closing the flow passage ahead of the compensating valve for preventing flow through the fully open compensating valve when fluid flow is resumed to the passage after interruption, and operating means for the resiliently loaded means responsive to pressure increases in the flow passage ahead of the compensating valve when fluid flow is resumed to the passage after interruption gradually opening the passage.

4. A flow regulating valve for controlling flow in hydraulic power transmission systems comprising in combination means forming a flow passage, in series in said passage an adjustable throttle through which fluid is adapted to flow at a regulated rate and a pressure compensating valve, operating means for the compensating valve responsive to the pressure drop across the throttle and causing the compensating valve to assume various regulating positions to maintain the pressure drop across the throttle constant and including biasing means which normally tend to move the compensating valve to the fully open position when flow to the passage is interrupted, a resiliently loaded sleeve for controlling said passage ahead of the compensating valve including means for closing and opening the passage, said sleeve being biased to a position closing the passage when flow to the passage is interrupted, and operating means for the sleeve responsive to pressure increases in the passage ahead of the compensating valve when flow is resumed to the passage after interruption for causing the sleeve to gradually open the passage.

5. A flow regulating valve for controlling flow in hydraulic power transmission systems comprising in combination means forming a flow passage having an inlet and an outlet, in series in said passage an adjustable throttle through which fluid is adapted to flow at a regulated rate and a pressure compensating valve, operating means for the compensating valve responsive to the pressure drop across the throttle and causing the compensating valve to assume various regulating positions to maintain the pressure drop across the throttle constant and including biasing means which normally tend to move the compensating valve to the fully open position when flow to the inlet of the passage is interrupted, resiliently loaded means biased to a position closing the flow passage ahead of the compensating valve for preventing flow through the fully open compensating valve when fluid flow is resumed to the inlet of the passage after interruption, and operating means for the resiliently loaded means responsive to pressure increases at the inlet of the flow passage when flow is resumed thereto after interruption and gradually opening the passage.

6. In a hydraulic power transmission system having a fluid pump, a fluid motor, and control means for selectively operating the motor and interrupting fluid flow to the motor for stopping the same, a flow regulating valve for controlling the speed of the motor comprising in combination means forming a flow passage connected to the motor, in series in the passage an adjustable throttle through which fluid is adapted to flow at a regulated rate and a pressure compensating valve, means for operating the compensating valve responsive to the pressure drop across the throttle and causing the compensating valve to assume various regulating positions to maintain the pressure drop across the throttle constant and including resilient means biasing the compensating valve to the fully open position when flow to the passage is interrupted, a resiliently loaded sleeve surrounding the compensating valve including means for opening and closing the passage, said sleeve being biased to a position closing the passage when the motor is stopped and flow to the flow passage is interrupted, and means for operating the sleeve responsive to predetermined increases in pressure in the passage ahead of the compensating valve when fluid flow is resumed to the passage after interruption for causing the sleeve to gradually open the passage.

7. In a hydraulic power transmission system having a fluid pump, a fluid motor, and control means for selectively operating the motor and interrupting fluid flow to the motor for stopping the same, a flow regulating valve for controlling the speed of the motor comprising in combination means forming a flow passage connected to the motor, in series in the passage an adjustable throttle through which fluid is adapted to flow at a regulated rate and a pressure compensating valve, means for operating the compensating valve responsive to the pressure drop across the throttle and causing the compensating valve to assume various regulating positions to maintain the pressure drop across the throttle constant and including resilient means biasing the compensating valve to the fully open position when flow to the passage is interrupted, resiliently loaded means biased to a position closing the flow passage ahead of the compensating valve for temporarily preventing flow through the compensating valve when fluid flow to the flow regulating valve is resumed after interruption, and operating means for the resiliently loaded means responsive to predetermined pressure increases in the flow passage ahead of the compensating valve when fluid flow is resumed to the flow passage after interruption for gradually opening the flow passage.

AMBROSE L. BUSSON.

REFERENCES CITED

The following references are of record in the file of this patent:

UNITED STATES PATENTS

| Number | Name | Date |
|---|---|---|
| 1,985,443 | Clute | Dec. 25, 1934 |
| 2,166,940 | Conradson | July 25, 1939 |
| 2,313,056 | Emerson et al. | Mar. 9, 1943 |